W. T. JEFFERSON.
ARTIFICIAL BAIT.
APPLICATION FILED MAY 25, 1910.
994,927.
Patented June 13, 1911.
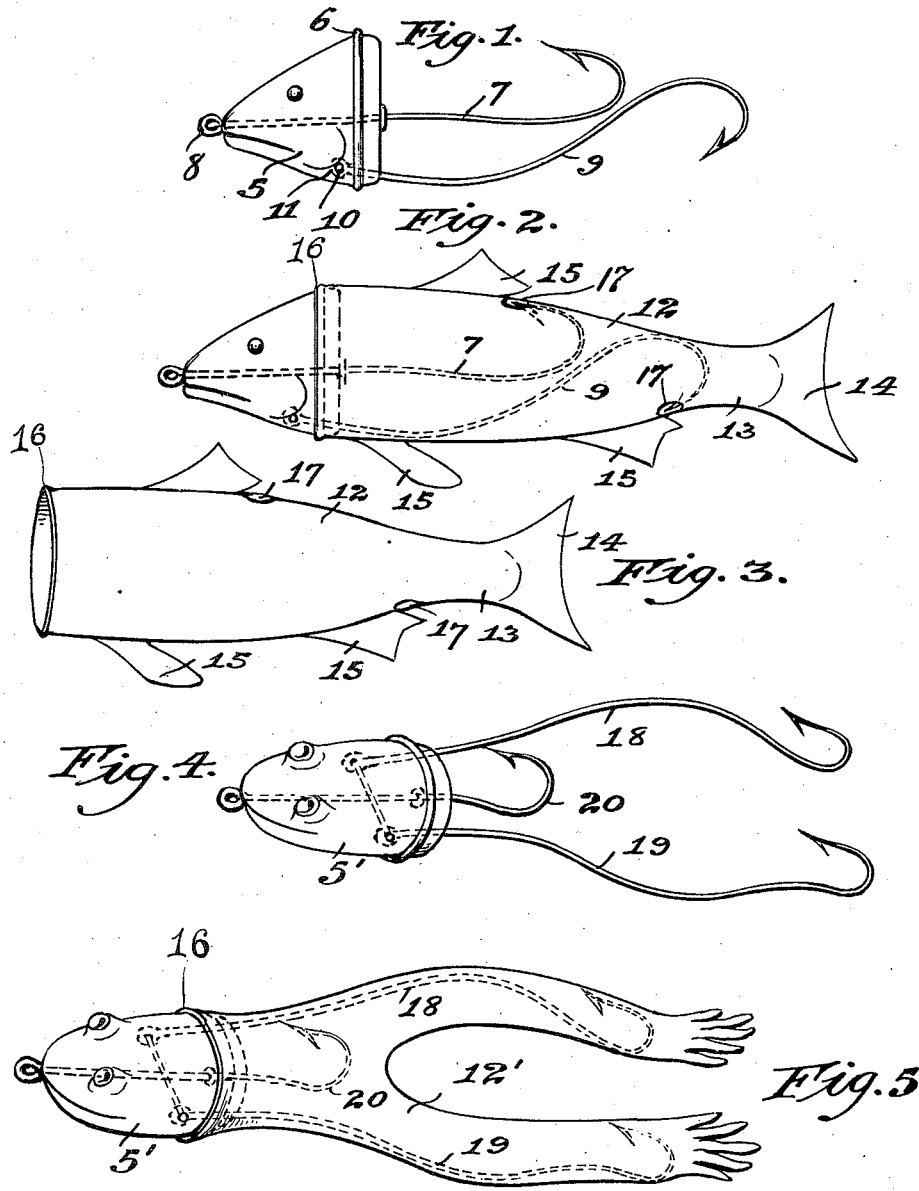

UNITED STATES PATENT OFFICE.

WILLIAM T. JEFFERSON, OF EVANSTON, ILLINOIS.

ARTIFICIAL BAIT.

994,927.

Specification of Letters Patent. Patented June 13, 1911.

Application filed May 25, 1910. Serial No. 563,372.

*To all whom it may concern:*

Be it known that I, WILLIAM T. JEFFERSON, a citizen of the United States, residing in Evanston, in the county of Cook, in the State of Illinois, have invented certain new and useful Improvements in Artificial Bait, of which the following is a specification.

The invention relates to an artificial bait for fishing, and which is adapted to be used as a bait for casting or for trolling.

Artificial baits of all classes are commonly colored in imitation of the natural bait which they are made to represent, and after such baits have been in use the coloring material comes off, due to numerous causes, rendering the bait unattractive as a lure, and therefore practically useless for the purposes intended.

One of the primary objects, therefore, of my invention, is to provide an artificial bait wherein substantially the entire body portion thereof is capable of being quickly and easily removed for the substitution of a new body portion.

In most artificial baits, either the entire hook, or parts thereof, are exposed, which excites the suspicion of fish; furthermore, it is objectionable to have the hook, or hooks exposed, and particularly the sharp ends thereof, for the reason that the hooks catch upon weeds, logs, or other obstacles in the water.

Another object of my invention, therefore, is to conceal and guard the hooks.

Still another feature of the invention is to so construct the artificial bait that the same will be durable and efficient in accomplishing the purposes intended.

To these and analogous ends, the invention embraces a rigid, or semi-rigid portion, preferably the head, to which the frame of the bait is secured, and in the preferred construction, the frame is formed by the hook, or hooks themselves with a body material adapted to be drawn over the frame and removably secured to the rigid portion.

The covering, or body, of the bait consists, in the preferred form, of a thin material capable of being expanded, such as thin rubber.

The accompanying drawing illustrates the artificial bait in the forms of a minnow, or small fish, and frog; but of course it is obvious that the principles of the invention, as herein set forth, may be embodied in forms simulating other kinds of bait.

Figure 1 is an elevational view of the head or rigid portion with the framework attached; Fig. 2 is a view in side elevation of an artificial minnow; Fig. 3 is a perspective view of the body cover; Fig. 4 is a slightly modified form; Fig. 5 is a similar view as Fig. 4 with cover over framework.

Referring now more particularly to the drawing, the head (5) of the bait is made of a rigid, or semi-rigid, material—preferably wood or hard rubber—the rear, or base portion of the head being provided with a suitable bead (6) for a purpose hereinafter described.

In the preferred form of construction hooks 7 and 9 are used, which also constitute the framework for supporting the body cover; the shank of the hook (7) extending through the head of the fish and terminating in an eye (8), to which the line may be secured; the barbed point thereof being upturned and forming the back-bone support for the cover.

The hook (9) is somewhat longer than the hook (7), and has one end inserted within the head of the fish, or otherwise suitably secured thereto, such as by driving a pin (10) through the eye (11) at the end of the hook. The curved or barbed end of the hook (9) is turned downwardly; the shank of the hook being long enough so that the curved end thereof acts as a support for the body cover at the root of the tail.

If desired, the hooks (7) and (9) may come in contact with each other and be soldered together at point 11, to give rigidity and greater durability to the structure.

The body member, or cover 12, consists of a light flexible material, preferably thin rubber, in the form of a tube, having a tapering and closed end (13) to which a tail (14) may be secured, or the tail may be formed integral with the cover, if so desired.

In the form herein shown, the tail is composed of exceedingly thin rubber, and in use the trembling or waving motion of the tail of a live bait is very closely imitated. This is also true of the fins (15), which also consist of thin rubber. One end of the cover, or body is open and may be provided with an extra thickness, or bead, of rubber (16) at the periphery of the opening, so as to form a slightly contracted throat, which is stretched over the bead (6) on the head (5) to firmly secure the body cover to the head. The body cover is applied to the frame work by inserting the curved ends of the hooks (7 and 9) therein and drawing the cover toward the head until the closed end of the cover stops against the curved end of the hook (9), whereupon by slightly stretching the cover the contracted throat end thereof may be drawn over the bead (6).

It is of course readily understood that in the construction, as described, the covering is of such light material and the points of the hooks are so arranged within the same that when a fish strikes or bites the bait, the sharp points of the hook will easily puncture and pass through the light covering, and hook the fish with the same efficiency as if the points of the hooks were at all times exposed.

In the form of construction, such as shown in Fig. 3, suitable apertures (17) may be formed in the covering adjacent the pointed ends of the hooks, which points, however, lie beneath the covering; the purpose of such openings being only to allow the prong ends of the hooks to more readily pass through the covering. I deem this unnecessary where a light form of covering is used, such as I prefer.

It will be seen that in the construction shown, if the covering is damaged, a new covering may easily and readily be applied.

In Figs. 4 and 5 I have shown a modified construction in which the bait is made to simulate a frog. In this construction, as in that previously described, there is a rigid head portion, 5', to which are suitably attached a series of hooks, (18, 19 and 20). The two hooks 18 and 19 have relatively long shanks suitably shaped to form skeleton frames for those portions of the bait which simulate the hind legs of the frog, while the hook 20 is made shorter and lies concealed within the body portion of the bait. Over the skeleton frame thus formed, is stretched a cover, 12', which approximately simulates the body of a frog; the front end of this cover being secured to the head, substantially as in the previously described construction.

As hereinbefore intimated, I wish it distinctly understood that I do not limit myself to the precise detail of construction herein shown, as it is obvious that more than three hooks, and even a single hook, might be employed without departing from the spirit of my invention, and therefore, without confining myself to the particular details of construction herein shown,

I claim:

An artificial bait comprising a head and framework consisting of hooks rigidly secured to said head and arranged to give the form of the body of the bait, and a cover of thin, flexible material adapted to be drawn over said hooks, so as to conceal the ends of the same, and apertures in said cover adjacent the pointed ends of the hooks, the ends of said hooks lying within the cover and fins adjacent said apertures and between said apertures and the head of the bait.

WILLIAM T. JEFFERSON.

Witnesses:
 EMILIE ROSE,
 ALBERT H. GRAVES.